United States Patent [19]

Jones, Jr.

[11] 4,451,986

[45] Jun. 5, 1984

[54] ULLAGE TAPE WINDER

[75] Inventor: John P. Jones, Jr., Greenwich, Conn.

[73] Assignee: Mobil Oil Corporation, New York, N.Y.

[21] Appl. No.: 332,702

[22] Filed: Dec. 21, 1981

[51] Int. Cl.³ .............................................. G01F 23/04
[52] U.S. Cl. ................................................... 33/126.5
[58] Field of Search ..................... 33/126, 126.5, 126.6, 33/126.7 R, 126.7 A, 126.4 RA; 73/321

[56] References Cited

U.S. PATENT DOCUMENTS

| | | | |
|---|---|---|---|
| 1,585,382 | 5/1926 | Haigh et al. | 73/321 |
| 2,295,218 | 9/1942 | Jurs | 33/126.7 R |
| 2,364,346 | 12/1944 | Dice | 33/126.5 |
| 2,368,589 | 1/1945 | Bierman | 33/126.5 |
| 2,580,320 | 12/1951 | Quist | 33/126.5 |
| 2,704,891 | 3/1955 | Ferrier et al. | 33/126.5 |
| 2,904,998 | 9/1959 | Jurs et al. | 33/321 |
| 3,154,854 | 11/1964 | Shatto et al. | 33/126.5 X |
| 4,003,260 | 1/1977 | Catoul | 73/423 R |
| 4,099,332 | 7/1978 | Jones, Jr. | 33/126.7 R |

FOREIGN PATENT DOCUMENTS

| | | | |
|---|---|---|---|
| 1023306 | 12/1952 | France | 73/321 |
| 370416 | 4/1932 | United Kingdom . | |
| 826805 | 1/1960 | United Kingdom . | |
| 848988 | 9/1960 | United Kingdom | 33/126.5 |
| 1209483 | 10/1970 | United Kingdom . | |

Primary Examiner—Harry N. Haroian
Attorney, Agent, or Firm—A. J. McKillop; M. G. Gilman; J. F. Powers, Jr.

[57] ABSTRACT

An ullage gauge for directly and accurately measuring the ullage of a cargo tank of a vessel such as an oil tanker without the necessity of opening the hatch. The gauge is comprised of a calibrated ullage tape which is supplied from a winder reel positioned within a sealed chamber atop the deck of the tanker and communicating with the cargo tank, the winder reel being rotated by a winder reel handle placed exterior of said sealed chamber. The sealed chamber includes a view window which allows direct observation of the calibrated surface of the ullage tape as well as direct observation of the rising cargo within the cargo tank. A float attached to the ullage tape is of sufficient size and weight that once contact of the float with the surface of the cargo is made, such contact is felt by the operator through the winder reel handle.

12 Claims, 7 Drawing Figures

U.S. Patent   Jun. 5, 1984   Sheet 1 of 2   4,451,986
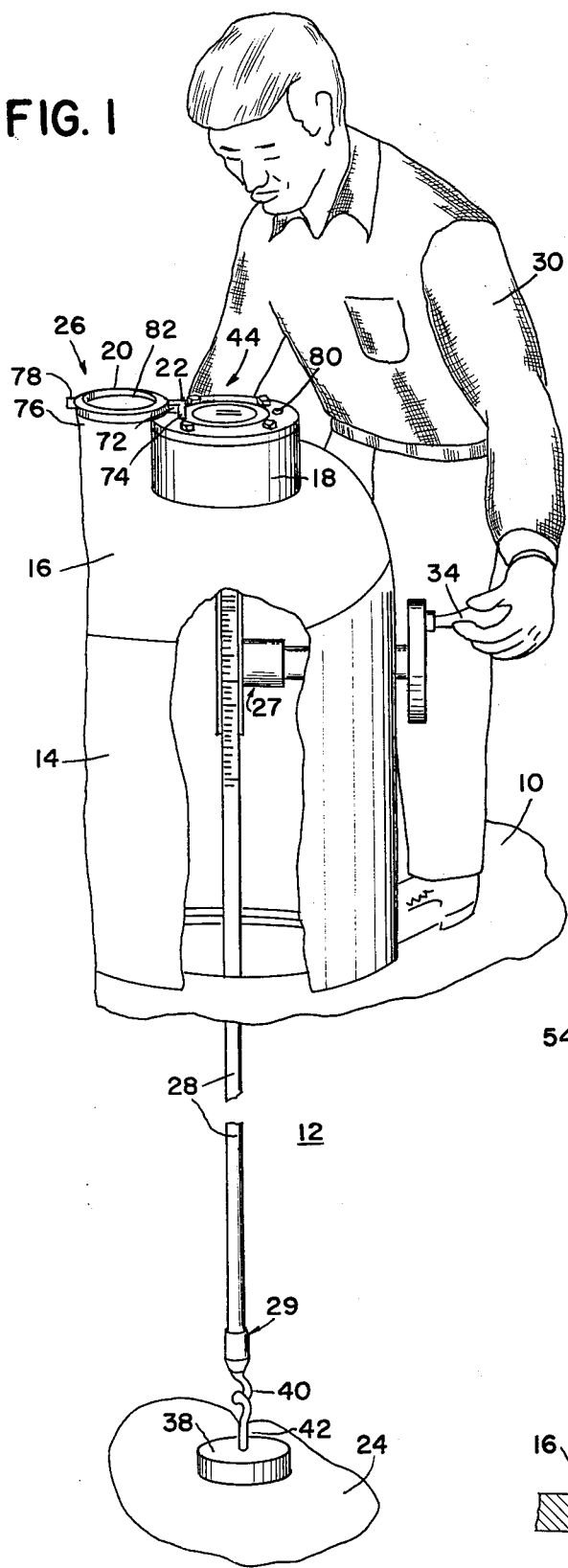
FIG. 1
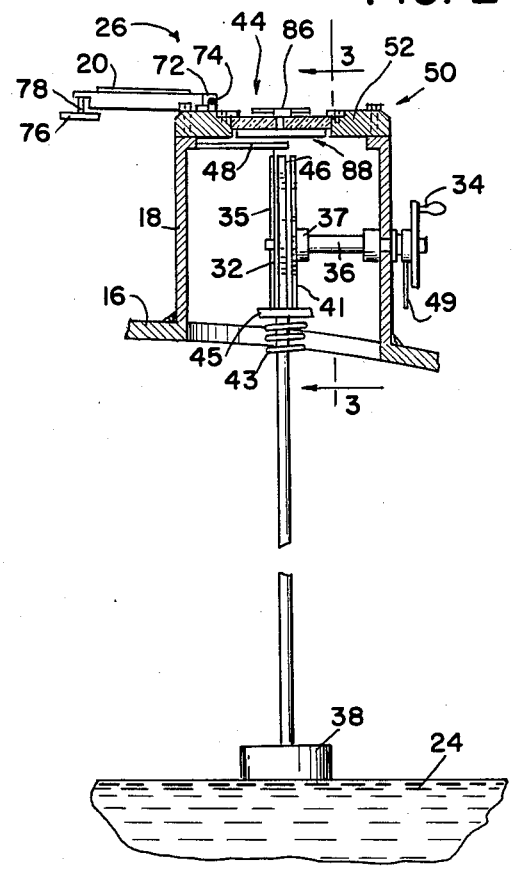
FIG. 2
FIG. 3

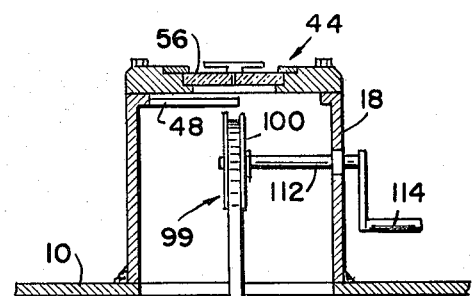
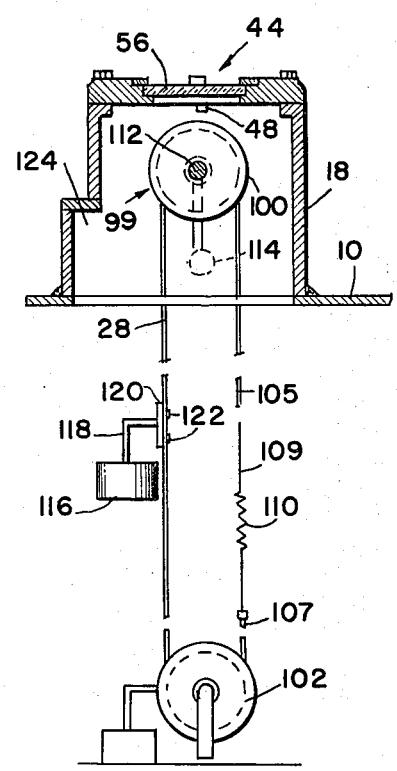
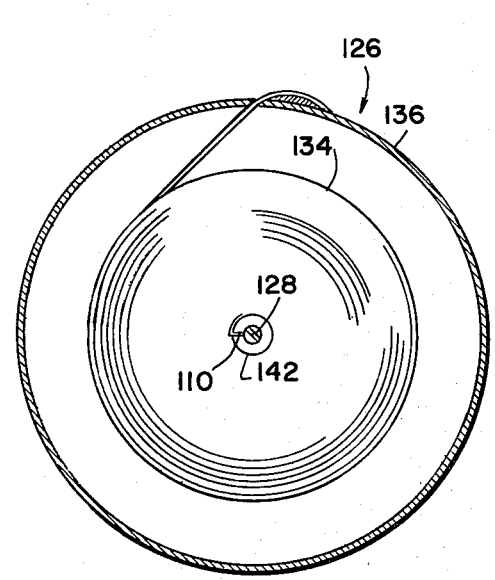
FIG. 7
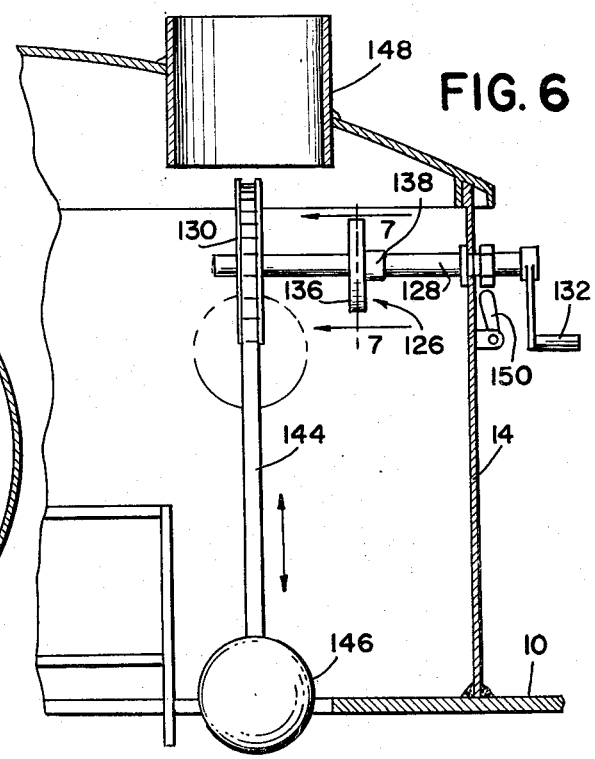

ULLAGE TAPE WINDER

BACKGROUND OF THE INVENTION

1. Field of the Invention

The present invention relates to an ullage gauge and more particularly relates to an improved gauge for directly and accurately measuring the ullage of a cargo tank of a vessel such as an oil tanker. Specifically, the present invention relates to a hand ullage tape winder contained within a sealed chamber above the cargo tank but operable from the exterior of the tank to measure the ullage and to visability of the ullage tape and the interior of the cargo tank being provided by a view window within the sealed chamber.

In loading liquid cargo vessels such as oil tankers, the volume of liquid in a cargo tank is routinely determined by measuring the "ullage" of the tank after the tank is loaded. Ullage is generally defined as the amount by which a cargo tank falls short of being full and is directly related to the distance between the top of the cargo and the underside of the top of the tank. In most commercial tankers, the ullage measurement is made from a special hatch, i.e., ullage hatch, which sets atop the main hatch into the cargo tank. Once the ullage measurement is made, a standard set of ullage tables for that particular cargo tank is consulted to establish the actual volume of cargo present in the tank. The cargo tanks of vessels carrying crude oil or liquid petroleum products in bulk are commonly calibrated in cubic feet, cubic meters or barrels (42 gallons).

As the over-all size of a cargo tank increases, the accuracy of the ullage measurement becomes more and more important. For example, due to the extremely large tanks on some modern tankers, an error of one-half inch in the ullage measurement can mean an error of 5,000 gallons or more in the actual volume of cargo in that tank. The economics involved in such an error is obvious.

In a typical cargo loading operation, liquid is normally loaded into a cargo tank at a high flow rate until the tank is filled to within 5 to 6 feet of the top of the tank which is, also, normally the underside of the main deck of the vessel. The flow rate is then substantially reduced to guard against accidental overfilling which may rupture the deck. The deck is then "topped off" by slowly filling the tank to within a few inches, e.g., 6 to 24 inches, of the deck.

Tankers are presently loaded at very high loading rates often exceeding 60,000 barrels per hour. Therefore, a small lapse in timing on the part of the loading staff could lead to an over-filling. To avoid over-filling, crewmen frequently open the ullage hatch and observe the cargo level first hand while "topping off".

Up until some years after World War II, the most common means of measuring the final ullage was by a hand ullage tape reel and ullage plumb bob. Subsequently, various types of automatic ullage gauges began to appear on the market. Most of these gauges were based upon a float system with some form of spring to maintain tension and coil the tape as the cargo level rose in the tank. Usually the tape itself acted as the spring. Over the years, the number and type of gauges have proliferated and the complexity, sophistication and cost of the equipment have increased greatly. The volume of the cargo in the tank is then determined from the ullage tables using the highly reliable hand ullage or automatic ullage gauges. Despite improvements in the design and performance, the automatic ullage gauges require some maintenance and are subjected to occasional failure with or without normal maintenance. Maintenance in the cargo tanks of an oil tanker is extremely difficult because, first, the tanks must be washed and freed from all gas before they are safe for entry, and second, access to the equipment may be difficult in a large vessel.

Additionally, developments in recent years have complicated the use of the conventional hand ullage gauge in topping off cargo tanks. For example, inert gas systems which are designed to provide non-flammable gases under pressure in a cargo tank, have to be released before the plumb bob can be lowered through the ullage hatch into the tank and obviously before the cargo level can be observed first hand. Releasing the inert gas reduces the margin of safety of the system in that there is a greater risk that air might be drawn into the cargo tank, thereby creating an explosive environment within the tank. Furthermore, other safety and occupational hazards greatly reduce the desirability of releasing the inert gas and therefore, such practice is very seldom permitted.

Accordingly, since the automatic gauges presently in use are not completely reliable and since the hatch covers of modern tankers can not be opened because of the presently used inert gas systems as well as other rules and regulations concerning the occupational safety aboard modern tankers making the use of the head ullage plumb bob cumbersome, the need exists for a relatively simple ullage gauge which can provide direct observation of the cargo level and provide hand ullaging without opening the hatch cover of the cargo tank.

2. Description of the Prior Art

U.S. Pat. No. 4,099,332 issued July 11, 1978 to the present inventor discloses an ullage gauge for directly and accurately measuring the ullage of a cargo tank of a vessel such as an oil tanker without the necessity of opening the tank. This patent attempts to solve the safety hazards posed by the release of the inert gas during the "topping off" of the cargo tank. More specifically, the patent discloses a ullage gauge which comprises an indicator sword which is attached to the underside of the deck and extends downward into the cargo tank for a distance equal to the maximum expected ullage in the cargo tank. A view port is positioned through the deck adjacent the indicator sword so that the sword can be observed directly from the deck without opening the tank. The ullage gauge of this patent however, allows accurate reading of the ullage only near the top of the cargo tank, about the top 3 or 4 feet of the tank. Although such a limited measurement is generally all that is needed, with the presently used inert gas systems hindering the view of the rising level of the cargo and the high cargo loading rates commonly used, it is preferred to have a general idea of the ullage measurement over the entire cargo tank so as to better enable the prediction when the tank will be "topped off" and thus make the necessary precautions to avoid over-filling and subsequent adverse consequences.

Other patents which relate to devices for measuring changes in the volume of a liquid in a storage tank include: U.S. Pat. Nos. 4,192,187; 3,217,541; 2,852,938; 1,967,631; and 1,379,271. Each of the above patents discloses apparatus which include a tape windable onto and off a reel co-acting with a counter weight. In each of the patented apparatuses, a sight glass is provided to view the value of the cargo level measurement on the tape which is sealed within an enclosure. The apparatus disclosed in these patents rely on the balance between the counter weight and the float which is typically placed at the end of the tape as well as on the bearing system which allows the reel to rotate upon movement of the measuring tape. Accordingly, the patents disclose automatic operable gauges. Such gauges have been found to be susceptible to failure as well as requiring normal maintenance, features which have rendered automatic gauges disadvantageous in measuring the ullage in modern oil tankers for the reasons discussed above. Further, while the above prior patents disclose the addition of sight glasses to allow direct observation of the measurement from the tape, there appears to be no requirement that the sight glass allow direct observation of the rising liquid level in the tank. As discussed above, in view of the high loading rates presently used to fill the cargo tanks of oil tankers, direct observation of the rising liquid level is a substantial necessity in order to avoid over-filling.

SUMMARY OF THE INVENTION

The present invention provides an ullage gauge for directly observing the cargo level in the cargo tank and for accurately determining the ullage of a cargo tank without the need for opening the tank.

Structurally, the ullage gauge comprises a calibrated means for measuring the ullage and a means operable by hand to move the calibrated means relative to the cargo level. In particular, the ullage gauge comprises an ullage tape winder including a hand ullage tape which is placed in a sealed chamber above the cargo tank but which can be manipulated from outside the tank by hand so as to be extended into the tank for taking the ullage measurement. A view window is positioned within the sealed chamber to allow direct observation of the cargo level and observation of the ullage measurement from the tape from the deck of the vessel without opening the cargo tank.

More specifically, the ullage tape winder comprises a calibrated hand ullage tape which is wound about a winder reel. The winder reel is positioned within a sealed chamber above but in sealed communication with the cargo tank. The winder reel comprises a winder handle which is positioned exterior of the sealed chamber and placed on a winder shaft which extends from the winder reel through the wall of the chamber. The calibrated ullage tape is removed from the winder reel and lowered from the sealed chamber into the cargo tank by hand manipulation of the winder handle. A float is attached to the free end of the ullage tape and is of sufficient size and weight that once the float contacts the cargo as the ullage tape is lowered into the cargo tank, the float can be felt through the winder handle. The ullage of the cargo tank is read from the calibrated tape by observation through the view window at a point in which the calibrated tape passes over an idler reel which is positioned between the winder reel and the underside of the view window. The ullage measurement is then used to establish the actual volume of the cargo present in the tank by the use of the standard set of ullage tables.

An alternative ullage gauge structure is provided in which the calibrated ullage tape extends between spaced winder reels, an upper reel positioned within the top area of the cargo tank and a bottom reel positioned within the cargo tank adjacent to the bottom thereof. The free ends of the ullage tape extending beyond the circumferential surface of the respective winder reels are connected by the interposition of a tension spring to maintain the necessary tension in the ullage tape during measurement of the cargo level. As in the previous ullage gauge structure, the upper winder reel is associated with a reel shaft and an exterior handle which is manipulated by hand to move the calibrated tape relative to the cargo surface. In the alternative structure, however, the float is not secured to an end of the ullage tape, but is attached to about the center of the tape and off-set from the face thereof. The view window of the alternative ullage gauge allows direct observation of the rising cargo as well as the ullage measurement taken from the portion of the ullage tape extending over the top circumferential surface of the upper winder reel.

Optionally, the winder reel shaft can be provided with a spring element. Preferably, the spring element is similar in form to a clock spring which is connected to the winder shaft. The spring applies a mechanical bias to the shaft in order to ease the operation of rewinding the ullage tape.

The view window is installed in a cover plate, commonly called a "Butterworth cover" which is used to seal small service openings normally present in most cargo tanks such as the ullage hatch. By installing the view window in the cover plate, the need to cut additional openings through the deck is eliminated. A metal cover is added to maintain the view window clean and free from damage and a wiper mechanism is included on the underside of the view window to maintain clear visability.

BRIEF DESCRIPTION OF THE DRAWINGS

The actual construction, operation and the apparent advantages of the present invention will be better understood by referring to the drawings in which like numerals identify like parts and in which:

FIG. 1 is a perspective view of the present ullage gauge installed in a cargo tank of a vessel, a portion of the cargo tank being broken away to illustrate the relative placement of the ullage tape winder within the cargo tank;

FIG. 2 is a vertical sectional view of the present ullage gauge installed in a cargo tank of a vessel;

FIG. 3 is a vertical sectional view of the ullage gauge of FIG. 2 taken generally along line 3—3;

FIG. 4 is a side elevation, partly in section of an alternative ullage gauge provided by the present invention;

FIG. 5 is a front elevation, partly in section of the ullage gauge of FIG. 4;

FIG. 6 is a side elevation, partly in section of a modified ullage gauge;

FIG. 7 is a longitudinal sectional view of the modified gauge taken generally along a plane passing through line 7—7 of FIG. 6 and illustrating the optional spring counter-balance which can be added to the winder reel shaft.

THE PREFERRED EMBODIMENTS

Referring more particularly to the drawings, FIGS. 1, 2 and 3 illustrate a portion of deck 10 of a cargo vessel, e.g., an oil tanker. In vessels of this type, deck 10 normally overlies and forms the top of a cargo tank 12. Main entry into tank 12 is provided through main hatch 14 which is normally closed by cover 16 which may be pivotally mounted to hatch 14 by any conventional means for easy opening and closing. As a standard practice, mounted on cover 16 is a smaller hatch 18 (commonly called the ullage hatch) which is normally closed by cover 20 which may be pivotally mounted to ullage hatch 18 by means of pivot pin 22 for easy opening and closing.

As will be understood in the art, the ullage of tank 12 is normally measured through ullage hatch 18 by lowering a plumb bob measuring line therethrough. The ullage of a tank is that distance from the underside of deck 10 to the top of the cargo 24 in tank 12. Ullage tables are available for a particular tank 12 which gives the volume in a particular tank as a function of the ullage value. Obviously, methods of measuring the ullage by lowering a plumb bob required the opening of the ullage hatch. As mentioned previously, opening the ullage hatch to take the ullage measurement is a hazardous operation and not normally permitted on modern oil tankers.

In accordance with the present invention, ullage gauge 26 is provided which can directly measure the ullage of tank 12 without necessitating the opening of tank 12 to the atmosphere. Ullage gauge 26 not only provides the reliability of a hand ullage measurement, but additionally allows observation of the rising cargo 24 within tank 12. Ullage gauge 26 is basically comprised of an ullage tape winder 27 which guides a calibrated ullage tape 28 relative to cargo 24 by the hand of an operator 30. Ullage tape 28 is secured to and wound about the outer surface of a winder reel 32. Tape 28 is removed from the outer surface of winder reel 32 and is moved relative to the surface level of cargo 24 as winder reel handle 34 is rotated by hand. It can readily be seen that winder reel handle 34 is rotatably associated with winder reel 32 through winder reel shaft 36. Winder reel 32 is enclosed within main hatch 14 although winder reel 32 can be enclosed in any sealed hollow structure which opens into cargo tank 12 such as a pipe welded to deck 10. Handle 34 passes through a gas tight packing (not shown) in the side of main hatch 14 and shaft 36 is supported in suitable bearings for rotation. Placed on the free end 29 of ullage tape 28 is a float 38 which can be secured to tape 28 by means of a hook 40 securely catching eyelet 42 welded or otherwise secured to float 38. Of course, any suitable means may be utilized to secure float 38 to free end 29 of ullage tape 28. Float 38 is of sufficient size and weight so that once float 38 contacts the surface of cargo 24 such contact can be felt by the operator through handle 34. Preferably, the operator rotates handle 34 relatively slowly to accurately sense the exact time at which contact between float 38 and the surface of cargo 24 has been made, and thus an accurate measurement of the ullage of tank 12 can be determined. Ullage gauge 26 further includes a view window 44 which is placed through the upper surface of ullage hatch 18 and allows operator 30 to directly observe the rising level of cargo 24 in tank 12. Additionally, the specific ullage measurement can be read from the calibrated surface of ullage tape 28 by direct observation through view window 44. In order that an accurate reading can be taken from ullage tape 28, an idler reel 46 is positioned within ullage hatch 18 at a location between view window 44 and winder reel 32. Ullage tape 28 is supplied from winder reel 32 onto the circumferential surface of idler reel 46 and down between centering reel 31 and tension reel 33 and then is passed downward into cargo tank 12. Idler reel 46 is held in place by spaced frame arms 35 extending from bearing 37 while centering reel 31 and tension reel 33 are positioned between spaced frame arms 39 also extending from bearing 37. As ullage tape 28 passes over idler reel 46, the calibrated surface of tape 28 passes adjacent to view window 44 so that by direct observation accurate measurement of the ullage off of the calibrated surface of ullage tape 28 can be made. A pointer 48 rigidly secured to the interior surface of ullage hatch 18 and extending above and over idler reel 46 and passing into the field of view of view window 44 allows operator 30 to make a quick and accurate measurement of the ullage from ullage tape 28. In using the ullage measurement taken from ullage tape 28 to determine the volume of cargo in cargo tank 12, the length of tape extending above deck 10 within the sealed chamber formed by main hatch 14 and ullage hatch 18 and enclosing the ullage tape winder 27 will be taken into consideration before consulting the standard ullage tables for tank 12. A locking lever 49 secured to shaft 36 exterior of main hatch 14 locks handle 34 in place so that when the ullage tape winder is not in use, float 38 can be secured above deck 10 within the sealed chamber. Spaced frame arms 41 extending from bearing 37 support spring stop 43, a coil spring urged against and held by surface 45 which includes a slit to allow passage of tape 28 into cargo tank 12. Float 38 is urged against spring 43 when ullage tape 28 is rewound.

View window 44 preferably comprises a special quick-release cover plate 50 which is of the general type commonly referred to as a "Butterworth cover". Such covers are routinely used on commercial tankers to close the small service openings which are normally provided in deck 10 for servicing tank 12 and/or cargo 24. By incorporating ullage gauge 26 with cover plate 50, the components of the gauge can be easily removed for servicing if required and/or replacement as the need arises. As best seen in FIGS. 2 and 3, cover plate 50 is comprised of a plate element 52 which has a circumferential groove (not shown) on the underside thereof which carries a sealing means e.g., O-ring 54, for preventing leakage when plate 50 is in place over opening 51. An opening 55 is provided through plate element 52 which is covered by the view plate 56 which, in turn, is held in place by ring 57 and screws 58. A gasket 59 is positioned between plate element 52 and view plate 56 to prevent leakage around view plate 56. View plate 56 is comprised of a transparent material and is preferably of strong, unbreakable material, e.g., safety glass, thermo-plastic polycarbonate resin commercially available under the tradename of Lexan or similar material. Also, view plate 56 may have magnifying characteristics if necessary to aid operator 30 in taking a reading from ullage tape 28.

Cover plate 50 has a plurality of quick-release lock means 60 spaced about the periphery thereof for securing plate 50 in place over opening 51 in ullage hatch 18. Lock means 60 may be of any type which allows quick removal and installation of cover plate 50 while maintaining a tight seal between cover plate 50 and ullage hatch 18 around opening 51. An example of a view window which can be used is fully disclosed and described in inventor's U.S. Pat. No. 4,099,332, mentioned previously. Further, an example of a cover plate lock means is fully disclosed and described in inventor's U.S. Pat. No. 4,059,202.

In order to maintain the surface of view plate 56 clean and free from damage, a metal cover plate 20 is provided which is pivotally mounted to the exterior of ullage hatch 18 by means of pivot pin 22 passing through lugs 72 and 74 attached to cover plate 20 and the exterior of ullage hatch 18, respectively. Cover plate 20 can be locked in place over view window 44 by grabbing handle 76 and aligning rod 78 with hole 80 which is drilled through plate element 52 attached to ullage hatch 18. Cover plate 20 includes hollow opening 82 on the underside thereof to receive when in the closed position window wiper operating handle 86 positioned atop view plate 56. Urged against the underside of view plate 56 is window wiper 88 which comprises a pair of wiper blades 90 and 92 secured to hub 94. Window wiper operating handle 86 is secured to hub 94 by shaft 96 which rotates about sealing gasket 98 placed through view plate 56. Rotation of window operating handle 86 rotates shaft 96 and thereby moves wiper blades 90 and 92 across the underneath surface of view plate 56 to maintain such surface clean and allow sufficient visibility of the rising cargo level and the ullage measurement from ullage tape 28.

An alternative structure for moving ullage tape 28 relative to the surface of cargo 24 is illustrated in FIGS. 4 and 5. In this modification of the ullage gauge of the present invention, ullage hatch 18 is provided with a view window 44 equivalent to that described in reference to FIGS. 1-3. Additionally, cover plate 20 remains the same and protects the exterior surface of the view plate 56. Ullage tape winder 99 comprises an upper winder reel 100 and a spaced bottom reel 102. Upper winder reel 100 is provided in the sealed chamber formed by main hatch 14 and ullage hatch 18 above deck 10. Winder reel 100 is of sufficient diameter so as to position the calibrated surface of ullage tape 28 adjacent to ullage hatch 18. Pointer 48 is secured to the interior of the sealed chamber and extends above winder reel 100 between the underside of view plate 56 and the upper circumferential surface of winder reel 100. Bottom reel 102 is provided and is rotatably mounted adjacent to the bottom of tank 12. Any suitable means of mounting bottom reel 102 for rotation can be utilized. Such means may include an axle 104 secured for rotation between braces 106 and 108 welded or otherwise rigidly secured to the bottom of cargo tank 12. Bottom reel 102 will rotate about shaft 104 upon movement of ullage tape 28 which frictionally engages the outer surface of bottom reel 102. As opposed from ullage tape winder 27 in which ullage tape 28 is wound fully around a winder reel 32 and supplied solely therefrom, and in which float 38 is secured to the single free end of ullage tape 28, in the modified structure, ullage tape 28 extends between reels 100 and 102 such that the opposite free ends 104 and 106 of ullage tape 28 extend around and beyond the circumferential surface of respective reels 100 and 102. Free ends 105 and 107 of ullage tape 28 are joined together by tape connector wire 109 which has interposed therethrough tension spring 110 such that ullage tape 28 resembles an endless belt mounted for movement between spaced reels 100 and 102. Tension spring 110 maintains the required tension throughout ullage tape 28 to provide accurate ullage measurement which is taken by direct observation through view window 44 from the calibrated surface of ullage tape 28 passing over the top circumferential surface of reel 100. The ullage measurement is determined by hand in which winder reel 100 is rotatable about a winder reel shaft 112 supported in suitable bearings (not shown) and extending to the exterior of the sealed chamber formed by main hatch 14 and ullage hatch 18. A reel handle 114 is secured to the portion of shaft 112 which extends beyond ullage hatch 18. Rotation of handle 114 by operator 30 moves ullage tape 28 relative to both reels 100 and 102. A float 116 is secured to the face of ullage tape 28 at a point intermediate between reels 100 and 102. As can readily be seen in FIG. 4, float 116 is off-set or transversely spaced from the face of ullage tape 28 by means of connector 118 which secures float 116 to ullage tape 28. Connector 118 is secured to the face of ullage tape 28 by means of a connector plate 120 which is attached to ullage tape 28 by means of screws 122 or by other conventional means such as welding, by adhesive, etc. In order to provide sufficient clearance for float 116 when the ullage measurement is not required, the sealed chamber above tank 12 is provided with an off-set chamber 124 which has sufficient volume to accommodate float 116.

A further modification of the ullage gauge of the present invention is shown in FIGS. 6 and 7 in which a spring counter balance 126 is connected to the winder reel shaft 128 which links winder reel 130 with winder reel handle 132. Spring 126 comprises a clock-spring 134 which is formed of wound strip metal positioned within shell or casing 136. Shell 136 is connected to the frame of the ullage tape winder such as at stationary bearing casing 138. Shell 136 then remains stationary as winder reel shaft 128 rotates. One end of clock-spring 134 is rigidly secured to shell 136 while the opposite end of clock-spring 134 is rigidly secured through slit 140 of arbor 142. Winder reel shaft 128 passes through the center of arbor 142 which rotates with the rotation of winder reel shaft 128. Upon the turning of winder reel handle 32, ullage tape 144 is removed from the surface of winder reel 130 and lowered into cargo tank 12. At the same time, clock-spring 134 uncoils. Once float 146 reaches the surface of the cargo, the ullage measurement is taken from the calibrated surface of tape 144 positioned on the circumferential surface of winder reel 130. Winder reel 130 has sufficient diameter so as to bring tape 144 close to the bottom of ullage pipe 148 and allow observation of tape 144 through the view window. When it is desired to raise float 146, clock-spring 134 eases the ability of the operator to wind winder reel handle 132. In some instances, retraction of float 146 can be completed automatically if the torque of clock-spring 134 is sufficiently large. A spring clip 150 can be pivotally mounted to the exterior of tank 12 in order to secure winder reel handle 132 once float 146 is fully retracted.

While dimensions may vary widely, a typical spring counter balance 126, will include a shell 136 having a diameter of slightly over 12 inches and an arbor having a diameter of slightly greater than 1 inch. A clock-spring 134 of hardened stainless steel 1 inch by 1/32 inch and a length of 154 feet and weight of about 16 pounds can be fully wound about arbor 142 and form a diameter of slightly greater than 8.5 inches. Typically, such a clock-spring will be fully unwound after 50 turns of winder reel shaft 128 and have a torque fully wound of about 13 inches-pounds and a torque at 44 turns of about 5.2 inches-pounds.

The floats which are utilized for the ullage tape winder should be of a material which will not concentrate the electrostatic field commonly present during tanker operations. A spark-proof brass float has been found acceptable in eliminating electrostatic discharge. The shape of the float can vary and include the disk shaped and spherical shaped floats illustrated in the drawings. The winder reel, winder reel shaft and winder reel handle are preferably formed of stainless steel.

From the above description, it can be seen that the present ullage gauge provides a simple and reliable means for directly, accurately and safely making the ullage measurement for the whole of the cargo tank which can be used with present ullage tables to determine the amount of cargo in the tank. By providing that this ullage measurement can be made without opening the cargo tank, serious safety hazards have been eliminated without any loss of accuracy or reliability.

I claim:

1. A gauge for directly measuring the ullage of a cargo tank located below the deck of a vessel, said gauge comprising:
    a sealed chamber positioned on said deck and communicating with the interior of said cargo tank,
    a winder reel positioned within said sealed chamber, said winder reel being manually rotatable by a reel handle extending to the exterior of said sealed chamber,
    a calibrated ullage tape wound about the surface of said winder reel,
    means connected to a reel shaft interposed between said winder reel and said handle for applying a torque to said reel shaft, and
    a float attached to said ullage tape of sufficient size and weight, such that contact of said float with the surface of the cargo is felt by the operator through the winder reel handle,
    said sealed chamber including a view window for permitting direct observation of the calibrated surface of said ullage tape to measure ullage when said float is on the surface of the cargo, as well as direct observation of the cargo level within the cargo tank.

2. The gauge of claim 1 wherein said ullage tape includes a free end vertically movable relative to said winder reel, said free end being connected to said float.

3. The gauge of claim 2 further including an idler reel positioned within said sealed chamber intermediate of said winder reel and said view window, said ullage tape being supplied from said winder reel and passing over said idler reel and vertically down into said cargo tank.

4. The gauge of claim 1 further including a bottom rotatable reel placed adjacent to the bottom of said cargo tank, said ullage tape extending from said winder reel to said bottom reel as an endless surface.

5. The gauge of claim 4 wherein said endless surface is interposed with a tension spring to maintain tension on said tape.

6. The gauge of claim 1 further including a pointer positioned within said sealed chamber intermediate of said view window and said ullage tape for indicating the ullage measurement on said ullage tape.

7. The gauge of claim 1 wherein said means for applying said torque comprises a clock-spring disposed about said reel shaft.

8. The gauge of claim 7 wherein said clock-spring is contained within a stationary, hollow shell disposed about said reel shaft, one end of said clock-spring being rigidly secured to said stationary shell and the other end of said clock-spring being rigidly secured to an arbor rotatably connected to said reel shaft.

9. The gauge of claim 3 further including a centering means positioned below said idler reel, where said ullage tape passes over said idler reel and down over said centering means before passing downward into said cargo tank.

10. The gauge of claim 9 wherein said centering means comprises a centering reel and a tension reel spaced slightly from said centering reel to allow said ullage tape to pass therebetween.

11. A gauge for directly measuring the ullage of a cargo tank located below the deck of a vessel, said gauge comprising:
    a sealed chamber including a view window positioned on said deck and communicating with the interior of said cargo tank;
    a winder reel positioned within said sealed chamber, said winder reel being manually rotatable by a reel handle extending to the exterior of said sealed chamber;
    a calibrated ullage tape wound about the surface of said winder reel;
    an idler reel positioned within said sealed chamber intermediate of said winder reel and said view window, said ullage tape being supplied from said winder reel and over said idler reel, said ullage tape passing over said idler reel being viewable through said view window;
    centering means positioned below said idler reel and including a centering reel and a tension reel spaced slightly from said centering reel, said ullage tape passing over said idler reel and down between said centering reel and said tension reel;
    a float attached to a free lower end of said ullage tape, said float being of sufficient size and weight such that contact of said float with the surface of the cargo is felt by the operator through the winder reel handle; and
    means below said centering means for applying a bias against said float when said ullage tape is rewound in an up position;
    whereby the portion of the calibrated surface of said ullage tape passing over said idler reel is directly observable through said view window when said float is on the surface of the cargo to measure the ullage of the cargo tank, as well as the cargo level within the cargo tank being directly observable through said view window.

12. A gauge for directly measuring the ullage of a cargo tank located below the deck of a vessel, said gauge comprising:
    a sealed chamber positioned on said deck and communicating with the interior of said cargo tank,
    a winder reel positioned within said sealed chamber, said winder reel being manually rotatable by a reel handle extending to the exterior of said sealed chamber,
    a calibrated ullage tape wound about the surface of said winder reel,
    a bottom rotatable reel positioned adjacent to the bottom of said cargo tank, said ullage tape extending down from said winder reel to said bottom reel as an endless surface, and
    a float attached to said ullage tape of sufficient size and weight, such that contact of said float with the surface of the cargo is felt by the operator through the winder reel handle, said float being horizontally offset from said ullage tape whereby said float is capable of contacting the bottom of the cargo tank,
    said sealed chamber including a view window for permitting direct observation of the calibrated surface of said ullage tape to measure ullage when said float is on the surface of the cargo, as well as direct observation of the cargo level within the cargo tank.

* * * * *